US012049862B2

(12) United States Patent
Heafitz et al.

(10) Patent No.: US 12,049,862 B2
(45) Date of Patent: Jul. 30, 2024

(54) APPARATUS FOR GENERATING ELECTRICITY FROM WATER FLOWING IN A RIVER

(71) Applicant: Charybdis, LLC, Aventura, FL (US)

(72) Inventors: Bruce Heafitz, Aventura, FL (US); William Edward Baxley, Hutchison Island, FL (US)

(73) Assignee: Charybdis, LLC, Aventura, FL (US)

( * ) Notice: Subject to any disclaimer, the term of this patent is extended or adjusted under 35 U.S.C. 154(b) by 17 days.

(21) Appl. No.: 17/982,894

(22) Filed: Nov. 8, 2022

(65) Prior Publication Data

US 2023/0147022 A1 May 11, 2023

Related U.S. Application Data

(60) Provisional application No. 63/276,832, filed on Nov. 8, 2021.

(51) Int. Cl.
*F03B 17/06* (2006.01)

(52) U.S. Cl.
CPC .................................. *F03B 17/062* (2013.01)

(58) Field of Classification Search
CPC ...... F03B 17/062; F03B 11/08; F03B 13/264; F03B 17/065; F05B 2260/63
See application file for complete search history.

(56) References Cited

U.S. PATENT DOCUMENTS

| | | | | |
|---|---|---|---|---|
| 4,737,070 A * | 4/1988 | Horiuchi | F03B 17/063 415/4.1 |
| 2007/0258806 A1 | 11/2007 | Hart | |
| 2009/0218822 A1 * | 9/2009 | Rink | F03B 13/264 290/54 |
| 2012/0013128 A1 | 1/2012 | Duke | |
| 2013/0229013 A1 | 9/2013 | Scharmann et al. | |

OTHER PUBLICATIONS

Written Opinion of the International Searching Authority for International Application No. PCT/US2022/049267, dated Feb. 8, 2023, five (5) pages.

* cited by examiner

*Primary Examiner* — Joseph Ortega
(74) *Attorney, Agent, or Firm* — Iandiorio Teska & Coleman, LLP

(57) ABSTRACT

An apparatus for generating electricity from water flowing in a river including a stator, a rotor which rotates to generate the electricity, wherein the rotor: rotates about an axis which extends in a direction which extends transversely from a first side to a second, comprises rotor blades which extend from the first side of the rotor, the inner end of the rotor blade is movably mounted such that rotor blade is movable between a first position and second position, the first position is one in which the rotor blade extends away from the side of the rotor for being engaged by the water such as to cause the rotor to rotate to generate the electricity.

13 Claims, 5 Drawing Sheets

APPARATUS FOR GENERATING ELECTRICITY FROM WATER FLOWING IN A RIVER

RELATED APPLICATIONS

This application claims benefit of and priority to U.S. Provisional Application Ser. No. 63/276,832 filed Nov. 8, 2021, under 35 U.S.C. §§ 119, 120, 363, 365, and 37 C.F.R. § 1.55 and § 1.78, which is incorporated herein by this reference.

FIELD OF THE INVENTION

This invention relates to an apparatus for generating electricity from water and, more especially, this invention relates to an apparatus for generating electricity from water flowing in a river.

BACKGROUND OF THE INVENTION

Apparatus is known which is for generating electricity from water flowing in a river. The known apparatus comprises a stator and a rotor which is rotatable with respect to the rotor. The rotor comprises rotor blades. The water flowing in the river encounters the rotor blades and causes the rotor to turn with respect to the stator and thereby generate the electricity. A major problem with using rivers as the power source to rotate the rotor is that the rivers contain debris which is carried along with the waterflow. The debris is in the form of objects of all types and sizes. Thus, for example, the debris may vary from a small size such for example as twigs and leaves, to a much larger size such for example as entire trees, roofs, furniture and oil drums. When the debris encounters the apparatus for generating the electricity, the debris may become tangled in the apparatus and thereby cause damage and/or reduced electrical power production.

The problem with the debris is well known. Attempts at debris management have concentrated on two main approaches. The first approach involves using a diversion structure to divert the debris. The second approach involves routine debris removal. Both of these approaches cause their own problems. More specifically, with the first approach, a diversion structure may be placed in front of the apparatus for generating the electricity and this may divert debris for a time. However, inevitably, the debris will accumulate on the diversion structure and will create a dam. The creation of the dam will reduce water flow into the apparatus and thereby reduce power production from the apparatus. In order to avoid this problem, the diversion structure must be routinely cleaned. If it is not routinely cleaned, then the debris may accumulate to the point that the diversion structure fails, resulting in a catastrophic impact of the failed structure on the apparatus for generating the electricity. With the second approach, routine debris removal of debris on the actual apparatus for generating electricity is time consuming and often difficult to do.

A further problem with the use of the known apparatus for generating electricity from water flowing in a river is that the known apparatus typically has a large number of moving parts. These moving parts may become fouled or damaged and thereby stop or reduce electrical power production. Most known apparatus for generating electricity is deployed such that the apparatus is maintained above the water surface in order to eliminate the need for water type seals, and also to eliminate corrosion and leaks into the rotor coils of the electrical generating apparatus. The maintenance of the apparatus above the water surface requires a floating linkage between submerged rotor blades and the remainder of the apparatus, with the floating linkage passing through the air-water interface. It is at this air-water interface that floating debris becomes concentrated and is likely to build up on the floating linkage. Furthermore, the floating linkage typically requires a large floating structure, for example a barge, to support the rotors below the water and the remainder of the apparatus above the water. The floating structure must be moored to the shore or to anchors positioned upstream in order to maintain the floating structure in position against the flow of water in the river. The required mooring lines also act as catchment devices for debris in the flowing river.

Almost all known types of apparatus for generating electricity from water flowing in a river have rotors having a rotational axis which is parallel to the direction of water flow. Thus, rotor blades on the rotor have faces which are directly into the flow of water in order to maximize capture area. One type of such known apparatus is an axial turbine which has propeller-type blades that face directly into the waterflow. These propeller-type blades are easily impacted by debris and thereby easily become damaged or jammed. Another type of such known apparatus is a horizontal axis turbine which comprises horizonal blades that span between two end supports with bearings and which rotates in the waterflow. The blades in these horizontal axis turbines are typically attached to a surface generator by a chain or belt drive that must pass from the water to the surface, and thus directly through the highest debris zone. Both of these known types of apparatus have experienced failures in river flows from debris, and they have thus not achieved permanent installation status.

Existing apparatus for generating electricity and designed for river use is typically rigidly fixed to some support structure, for example moored to a barge, fixed to a piling, or fixed to a section of a bridge foundation. Rigid mountings to the support structures require that the apparatus transfers debris impact energy to the support structures. This may impart very large loads to rotor blades and other parts of the apparatus and to supports and chains, with there being no force dissipation except for mechanical failure. Thus, the apparatus as installed must be able to absorb the brunt of impact and still be able to function, or in most cases simply survive until repairs can be made. Since a river flows constantly, the need for access to the known apparatus for repair purposes poses serious dangers for repair crews, who must often work from small craft in close proximity to the apparatus, or in close proximity to entangled debris. The repair crews may experience high waterflows and the possibility of additional debris whilst working to dislodge trapped debris.

In addition, when the apparatus for generating electricity is placed into a river and is secured to the shore, especially when the securing is effected with cables or ropes, the combination of drag and lift on the mooring cable or cables tends to pull the apparatus towards the shore and in line with the mooring cable. It then becomes necessary to either put an anchor directly upstream from the apparatus in the center of the river, or to moor the apparatus with two or more cables going to each shore on either side of the river, and balancing the apparatus near the center. The objective is to keep drag forces directly in line with the direction of flow in the river in order to balance the drag forces. This may be complicated by varying river flow speeds and/or by eddies in the river that tend to move the point of maximum flow from side to side, or to meander across the center line of the river. Furthermore, it is expensive and/or difficult to install large anchors in a fast flowing remote river without large equipment, or to span a river with mooring lines and maintain proper cable lengths. There is furthermore a problem with the electrical power cable that takes the generated electricity and how to run this cable back to shore so that the generated electricity may be utilized.

The above problems associated with generating electricity from water flowing in a river have resulted in river-based hydropower apparatus being less advanced than apparatus for generating electricity from water flowing in oceans or from tidal water, where debris loads are typically much less.

It is an aim of the present invention to avoid or reduce the above-mentioned problems.

SUMMARY OF THE INVENTION

Accordingly, in one non-limiting embodiment of the present invention there is provided apparatus for generating electricity from water flowing in a river, which apparatus comprises:

(i) a stator;

(ii) a rotor which is rotatable with respect to the stator in order to generate the electricity, and wherein:

(iii) the rotor rotates about an axis which extends in a direction transversely across the rotor from a first side to a second side of the rotor;

(iv) the rotor comprises a plurality of rotor blades which extend from the first side of the rotor;

(v) the rotor blades are such that each rotor blade has an inner end which is adjacent the first side of the rotor from which the rotor blade extends, and an outer end remote from the inner end;

(vi) the inner end of the rotor blade is movably mounted with respect to the rotor such that the rotor blade is movable between a first position and second position;

(vii) the first position is one in which the rotor blade extends away from the first side of the rotor for being engaged by the water such as to cause the rotor to rotate to generate the electricity;

(viii) the second position is one in which the rotor blade extends closer to the first side of the rotor than when the rotor blade is in the first position;

(ix) the second position is one in which debris which is in the water flowing in the river and which has become impacted against the rotor blade is able to be freed from the rotor blade by the water flowing in the river; and (x) the rotor blade is movable from the first position to the second position to free the rotor blade from the debris, and the rotor blade is movable from the second position to the first position to enable the rotor blade to resume the first position for generating the electricity.

The apparatus of the present invention is thus advantageous in that it is able to avoid or reduce the above problems caused by debris flowing in the river. The pivoting of the rotor blades about their inner end from the first position to the second position enables debris impacted against the rotor blades to be removed by the water flowing in the river. This provides an easy and convenient way of removing the debris. Once the debris is removed, the rotor blades are able to be moved from the second position back to the first position whereby the rotor blades are then positioned for maximum electricity production from the apparatus.

The apparatus is preferably one in which the rotor blade is movable between the first position and the second position by being pivotable. The rotor blades may however be movable between the first and second positions by being movable in other ways than pivotable.

Preferably, the first position is such that the rotor blade extends parallel to the axis of rotation. In this position, the rotor blades are able to extend at 90° from the side of the rotor. If desired however the rotor blades may extend at angles which are more than or less than 90°.

The apparatus of the present invention may include first biasing means for biasing the rotor blade permanently to the first position, and in which the first biasing means is such that it is configured to allow the rotor blade to move from the first position to the second position consequent upon a force on the rotor blade generated by the water flowing in the river and the debris impacted on the rotor blade exceeding a predetermined maximum value. On the predetermined maximum value being exceeded, the apparatus may be configured such that the rotor blade moves from the first position to the second position automatically. Alternatively, the apparatus may be configured such that the rotor blade is able to be moved manually or mechanically by external means. Thus, the movement may be automatic movement or movement due to the application of mover means.

The first biasing means is preferably a spring biasing means. Other types of biasing means may be employed. When the biasing means is a spring biasing means, then one or more springs may be employed. The spring may be coil springs or other types of springs.

The apparatus may include second biasing means for biasing the rotor blade from the second position to the first position after the rotor blade has moved from the first position to the second position in order to remove the impacted debris.

Preferably, the second biasing means is a spring biasing means. Other types of second biasing means may be employed. When the second biasing means is a spring biasing means, then the spring biasing means may be one or more springs. The springs may be coil springs or other types of spring. Typically, the first biasing means will exert a stronger biasing force than the second biasing means. This is to ensure that the blades extend in their desired position for giving maximum electricity production for as long as possible before impacted debris causes the predetermined maximum value to be exceeded.

The apparatus may be one in which the rotor blades extend from only the first side of the rotor. Preferably, the rotor blades extend from both the first and second sides of the rotor. With such a preferred configuration, the apparatus is able to have more blades for providing rotation of the rotor. Also, hydrodynamic forces on the apparatus from the flowing water are able to be balanced out by the rotor blades extending from both sides of the rotor.

Preferably, the apparatus is one in which the rotor rotates inside the stator. Other configurations may however be employed.

The rotor and the stator may conveniently be mounted in a frame. Advantageously, the frame is disc-shaped. The apparatus is then able to be deployed in the river such that the peripheral edges of the disc face the flow of water in the river. Other configurations may be employed.

The apparatus may include torque-balancing means for balancing torque on the apparatus caused by the water flowing in the river. The balancing of the torque is to stabilize the apparatus in use. It also helps to minimize strain on component parts of the apparatus. This in turn may give less component wear and/or less component breakages than might otherwise occur.

The torque-balancing means may be formed as part of the frame. Other positions for the torque-balancing means may be employed.

The torque-balancing means preferably comprises a tail fin. Other configurations for the torque-balancing means may be employed.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
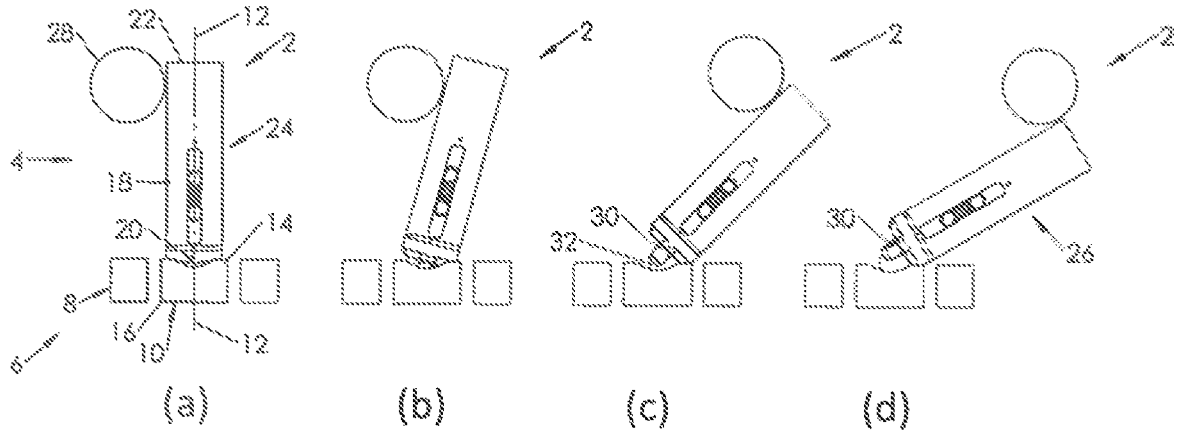
FIG. 1 shows a first apparatus for generating electricity from water flowing in a river.
Figure 2:
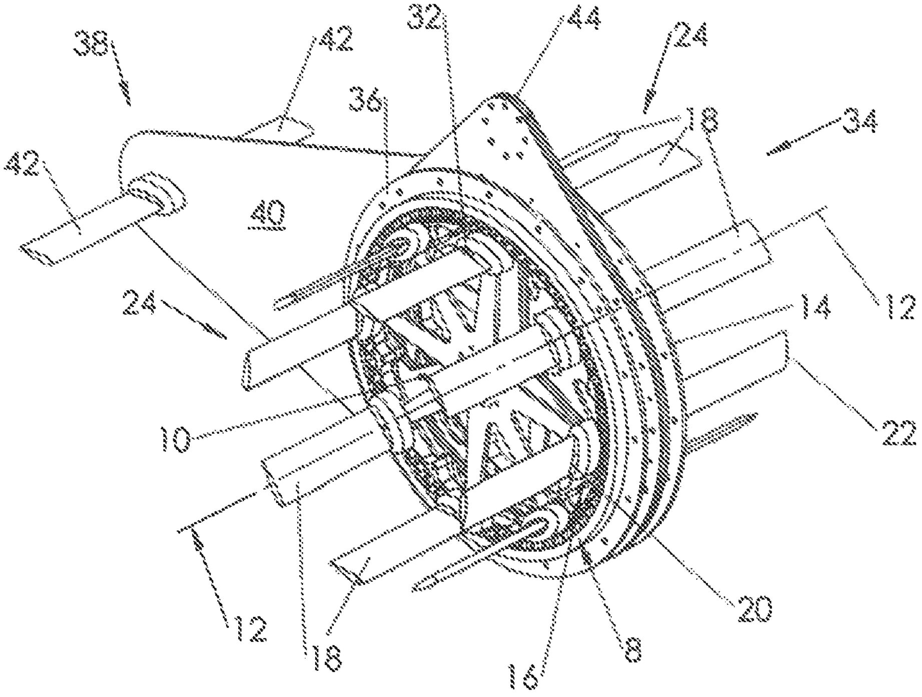
FIG. 2 is a perspective view of a second apparatus for generating electricity from water flowing in a river.
Figure 3:
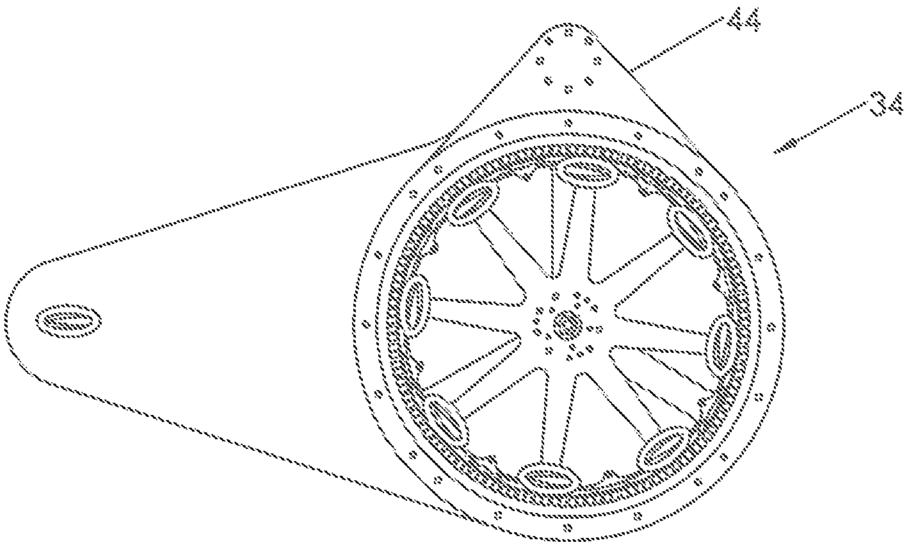
FIG. 3 is a side view of the apparatus shown in FIG. 2.
Figure 4:
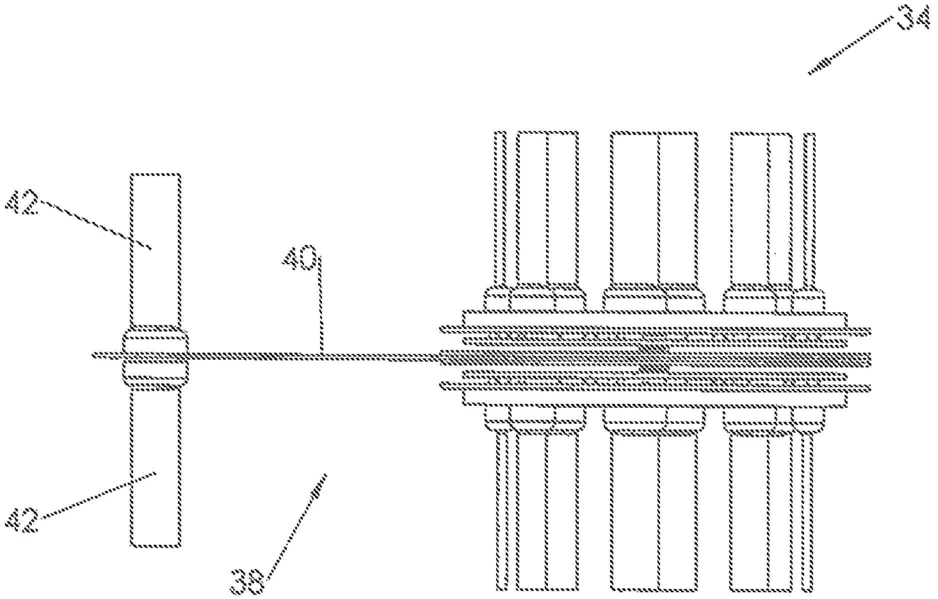
FIG. 4 is a top view of the apparatus shown in FIG. 2.
Figure 5:
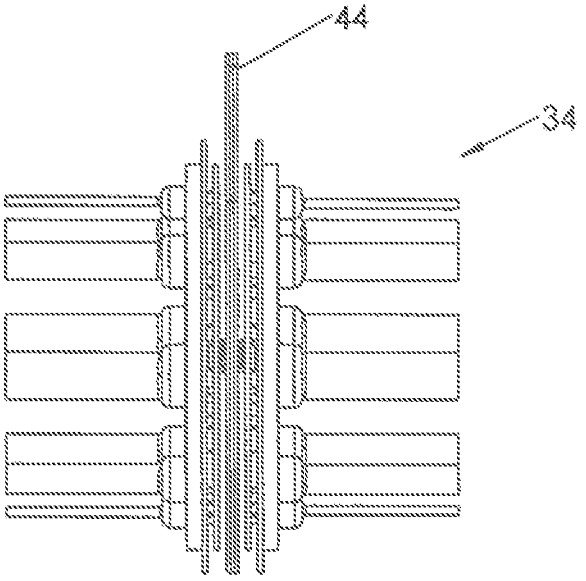
FIG. 5 is an end view of the apparatus shown in FIG. 2.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Referring to FIG. 1, there is shown apparatus 2 to generating electricity from water 4 flowing in a river 6. The apparatus 2 comprises a stator 8 and a rotor 10 which is rotatable with respect to the stator 8 in order to generate the electricity.

The rotor 10 rotates about an axis 12 which extends in a direction transversely across the rotor 10 from a first side 14 to a second side 16 of the rotor 10.

The rotor 10 comprises a plurality of rotor blades 18, only one of which is shown in FIG. 1 for simplicity of illustration. The rotor blades 18 extend from the first side 14 of the rotor 10. More specifically, the rotor blades 18 extend just from the first side 14 of the rotor 10. The rotor blades 18 are such that each rotor blade 18 has an inner end 20 which is adjacent the side of the rotor 10 from which the rotor blade 18 extends (i.e., the first side 14) and an outer end 22 remote from the inner end 20.

The inner end 20 of the rotor blade 18 is movably mounted with respect to the rotor 10 such that the rotor blade 18 is movable between a first position 24 which is shown at FIG. 1(*a*) to a second position 26 which is shown at FIG. 1(*d*).

The first position 24 is one in which the rotor blade 18 extends away from the first side 14 of the rotor 10 for being engaged by the water 4 such as to cause the rotor 10 to rotate to generate the electricity.

The second position 26 is one in which the rotor blade 18 extend closer to the first side 14 of the rotor 10 than when the rotor blade 18 is in the first position 24. As can best be appreciated from the sequence of FIGS. 1(*a*), (*b*), (*c*) and (*d*), the second position 26 is one in which debris 28 which is in the water 4 flowing in the river 6 and which has become impacted against the rotor blade 18 is able to be freed from the rotor blade 18 by the water 4 flowing in river 6.

The rotor blade 18 is movable from the first position 24 to the second position 26 to free the rotor blade 18 from the debris 28. The rotor blade 18 is movable from the second position 26 to the first position 24 to enable the rotor blade 18 to resume the first position 24 for generating the electricity. The movement of the rotor blade 18 from the second position to the first position occurs with a sequence of events extending from FIG. 1(*d*)-(*a*).

The rotor blade 18 is movable between the first position and the second position by being pivotable. The rotor blade 18 may be mounted by other mounting means for enabling the rotor blade 18 to be movable between the first position 24 and the second position 26. As can best be appreciated from FIG. 1(*a*), the first position 24 is such that the rotor blade 18 extends parallel to the axis of rotation 12. If desired, the rotor blade 18 may extend in the first position 12 at an angle to the axis 12.

The inner end 20 of the rotor blade 18 is movably mounted with respect to the rotor 10 by mounting means 30. The mounting means 30 is a pivotable mounting means.

The apparatus 2 includes first biasing means 32 for biasing the rotor blade 18 permanently to the first position 24. The first biasing means 32 is such that it is configured to allow the rotor blade 18 to move from the first position 24 to the second position 26 consequent upon a force on the rotor blade 18 generated by the water 4 flowing in the river 6 and the debris 28 impacted on the rotor blade 18 exceeding a predetermined maximum value. The first biasing means 32 is a spring biasing means but it may be another type of biasing means if desired, for example rubber bands or hydraulic or pneumatic cylinders. When the first biasing means 32 is a spring biasing means then it may comprise one, two or more springs. The springs are typically coil springs. Referring now to FIGS. 2-5, there is shown second apparatus 34 for generating electricity from water 4 flowing in a river 6. Similar parts as in the apparatus 2 have been given the same reference numerals for ease of comparison and understanding.

In FIGS. 2-5, the apparatus 32 has been shown with the rotor blades 18 in the first position 24. The rotor blades 18 are shown as extending from the first side 14 of the rotor 10 and also from the second side 16 of the rotor 10.

In the apparatus 34, the mounting means 30 is again a pivotable mounting means 30. The rotor 10 rotates in the stator 8, as it does in the apparatus 2. The rotation of the rotor 10 in the stator 8 is best appreciated from FIGS. 2 and 3. The stator 8 is disc-shaped and has a relatively narrow width, as can best be appreciated from FIGS. 2 and 5.

The stator 8 and the rotor 10 are mounted in a frame 36.

The apparatus 34 includes torque-balancing means 38 for balancing torque on the apparatus 34 caused by the water 4 flowing in the river 6. The torque-balancing means 38 is formed as part of the frame 36. The torque-balancing means 38 comprises a tail fin 40, control ailerons 42 and ballast weights (not shown). The apparatus 34 also comprises a portion 44.

Figures 6, 7, 8, 9:
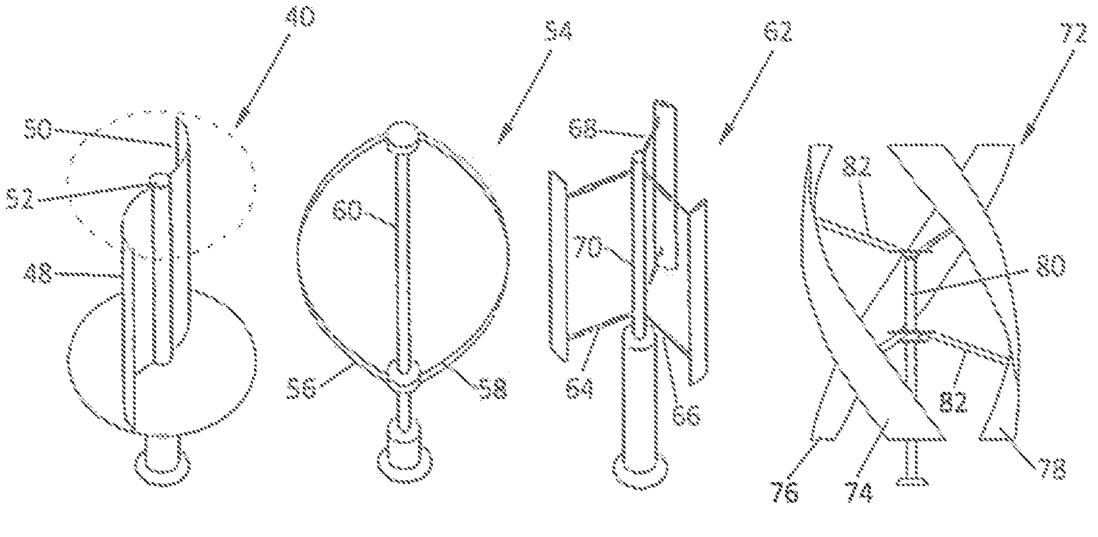
FIG. 6 shows a first alternative rotor blade configuration to the one shown in FIG. 2.
FIG. 7 shows a second rotor blade configuration to the one shown in FIG. 2.
FIG. 8 shows a third alternative rotor configuration to the one shown in FIG. 2.
FIG. 9 shows a fourth alternative blade configuration to the one shown in FIG. 2.

FIG. 6 shows a rotor blade 46 having curved blade elements 48, 50 mounted on a a shaft 52. The rotor blade 46 is of a Savonius shape.

FIG. 7 shows a rotor blade 54 having curved blade elements 56, 58 mounted on a shaft 60. The rotor blade 54 is of a Darrieus rotor blade shape.

FIG. 8 shows a rotor blade 62 having three flat blades 64, 66, 68 mounted on a shaft 70. The rotor blade 62 is of an H-Darrieus shape.

FIG. 9 shows a rotor blade 72 having three helix-shaped blades 74, 76, 78 which are mounted on a shaft 80 via mounting struts 82. The rotor blade 72 is of a helix shape.

Figure 10:
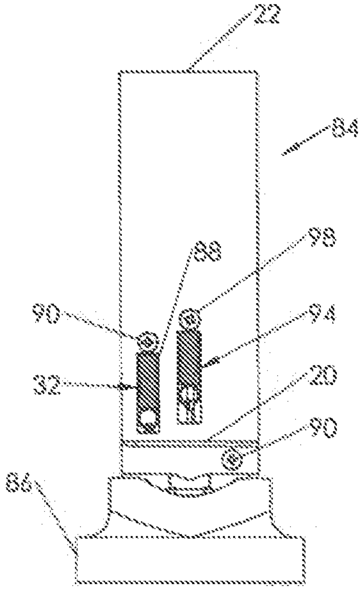
FIG. 10 shows part of further apparatus of the present invention and illustrates how the rotor may have a rotor blade which is spring biased by first and second biasing means.
Figure 11:
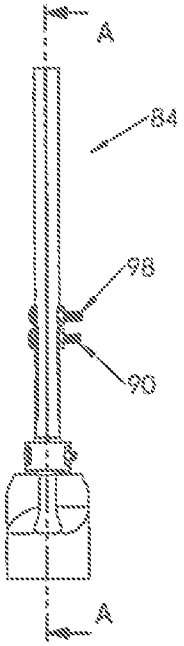
FIG. 11 is an end view of the rotor blade as shown in FIG. 10.
Figure 12:
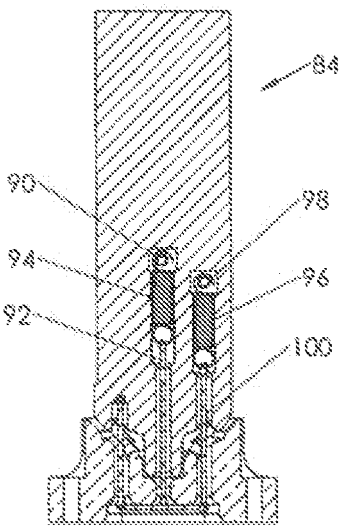
FIG. 12 is a second on the line A-A shown in FIG. 11.
Figure 13:
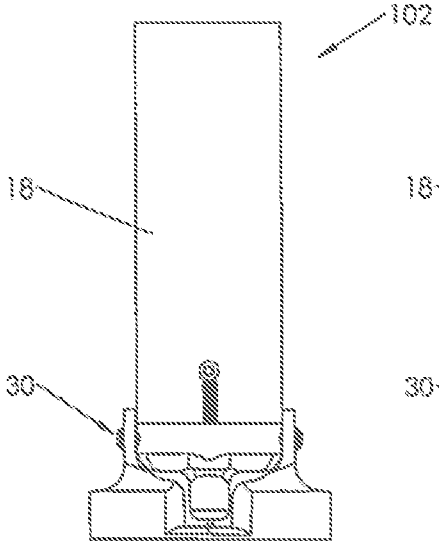
FIG. 13 shows a further alternative blade configuration with spring biasing means.
Figure 14:
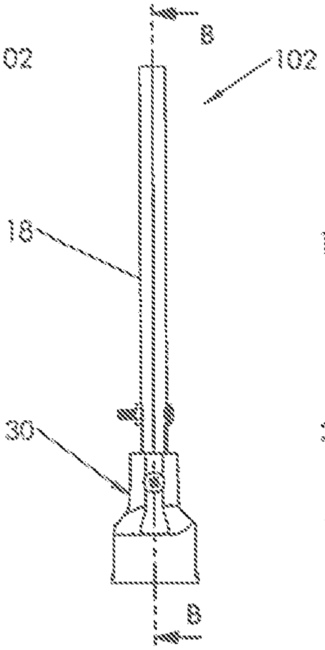
FIG. 14 is an end view of the blade configuration shown in FIG. 13.
Figure 15:
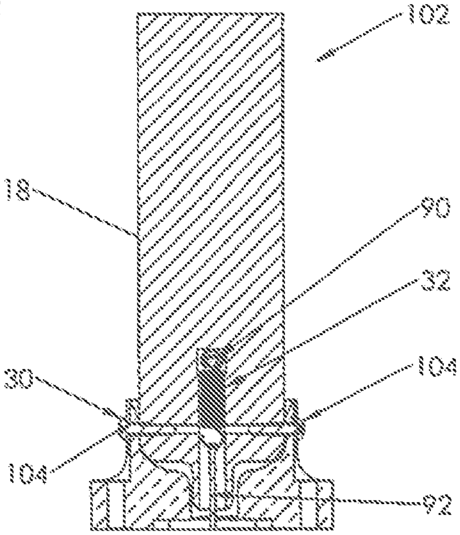
FIG. 15 is a section on the line B-B shown in FIG. 14.
Figure 16:
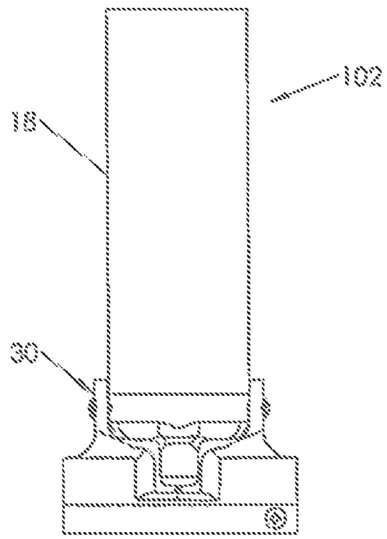
FIG. 16 is an end view which is like FIG. 13 but which does not illustrate the spring biasing means.
Figure 17:
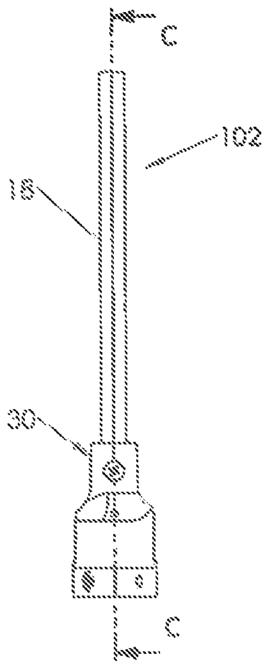
FIG. 17 is an end view like FIG. 14 and shows an anchor for one end of the spring biasing means shown in FIG. 13.
Figure 18:
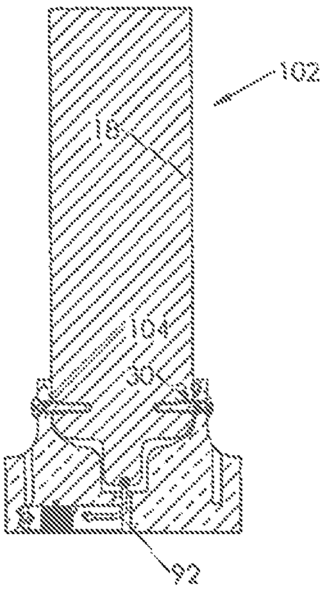
FIG. 18 is a section on the line C-C shown in FIG. 17.

FIGS. 10-12 show a rotor blade 84 having a base 86. The rotor blade 84 has an inner end 20 and an outer end 22. Inside the rotor blade 84 is mounted first biasing means 32 in the form of first spring biasing means 32 having a coil spring 88 located between an anchor pin 90 and an anchor cable 92.

The rotor blade 84 is also provided with second biasing means 94 for biasing the rotor blade 84 from the second position 26 to the first position 24 after the rotor blade 84 has moved from the first position 24 to the second position 26 in order to remove the impacted debris. The second biasing means 94 is a second spring biasing means 94 comprising a coil spring 96 which is anchored at one end to an anchor pin 98 and which is anchored at the other end to an anchor cable 100.

Referring now to FIGS. 13-18, there is shown a rotor blade 102 which is like the rotor blade 84. Similar parts have been given the same reference numerals for ease of comparison and understanding. In the rotor blade 102, there is only one biasing means which may be regarded as being the first biasing means 32. This biasing means 32 acts as both the first biasing means 32 and the second biasing means 94 in the rotor blade 84.

Figure 19:
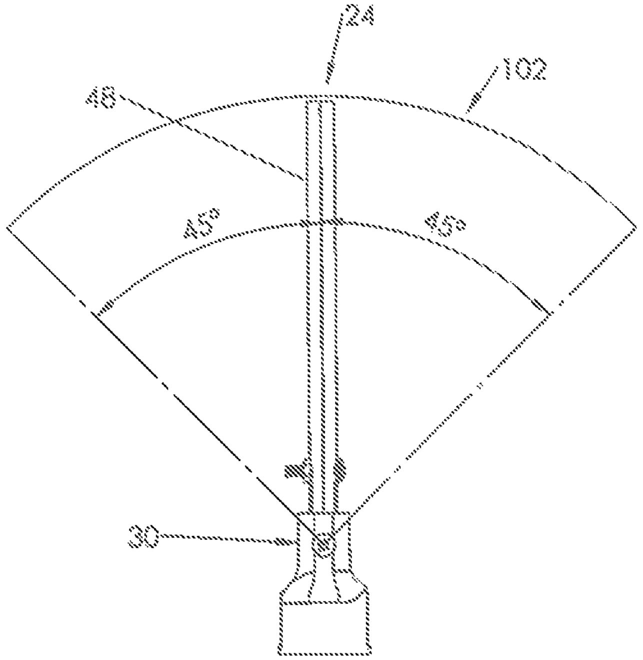
FIG. 19 is a view like FIG. 14 and illustrates the range of movement of the rotor blade.

FIG. 19 illustrates how the rotor blade 102 is able to pivot about its mounting means 30 over an angle of 45° to either side of the first position 24. Pivotal movement will only be required in the direction of flow of the water 4 in the river 6. Making the pivotable mounting means 30 such that the rotor blade 102 can pivot in either direction, enables the rotor blade 102 to be easily and appropriately mounted on any chosen side 14, 16 of the apparatus of the invention. Pivoting occurs about two pivot pins 104, 106.

The connection of the coil springs to the cables in the apparatus 84, 102 is advantageous in that the cables are easily able to be bent around surface configurations which would not allow the coil springs similarly to be bent.

It is to be appreciated that the embodiments of the invention described above with reference to the accompanying drawings have been given by way of example only and that modifications may be effected. Thus, for example, the stator, the rotor, the rotor blades, the mounting means and the torque-balancing means may be of different constructions to those shown. Individual components shown in the drawings are not limited to use in their drawings and they may be used in other drawings and in all aspects of the invention. The invention also extends to the individual components mentioned and/or shown above, taken singly or in any combination.

The subject invention, however, in other embodiments, need not achieve all these objectives and the claims hereof should not be limited to structures or methods capable of achieving these objectives.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

What is claimed is:

1. An Apparatus for generating electricity from water flowing in a river, which apparatus comprises:

a stator;

a rotor which is rotatable with respect to the stator in order to generate the electricity, and wherein:

the rotor rotates about an axis which extends in a direction transversely across the rotor from a first side to a second side of the rotor;

the rotor comprises a plurality of rotor blades which extend from the first side of the rotor;

the rotor blades are such that each rotor blade has an inner end which is adjacent the first side of the rotor from which the rotor blade extends, and an outer end remote from the inner end;

the inner end of the rotor blade is movably mounted with respect to the rotor such that the rotor blade is movable between a first position and second position:

the first position is one in which the rotor blade extends away from the side of the rotor for being engaged by the water such as to cause the rotor to rotate to generate the electricity;

the second position is one in which the rotor blade extends closer to the side of the rotor than when the rotor blade is in the first position;

the second position is one in which debris which is in the water flowing in the river and which has become impacted against the rotor blade is able to be freed from the rotor blade by the water flowing in the river; and the rotor blade is movable from the first position to the second position to free the rotor blade from the debris, and the rotor blade is movable from the second position to the first position to enable the rotor blade to resume the first position for generating the electricity.

2. The apparatus according to claim 1 in which the rotor blade is movable between the first position and the second position by being pivotable.

3. The apparatus according to claim 1 in which the first position is such that the rotor blade extends parallel to the axis of rotation.

4. The apparatus according to claim 1 and including first biasing means for biasing the rotor blade permanently to the first position, and in which the first biasing means is such that it is configured to allow the rotor blade to move from the first position to the second position consequent upon a force on the rotor blade generated by the water flowing in the river and the debris impacted on the rotor blade exceeding a predetermined value.

5. The apparatus according to claim 4 in which the first biasing means is a spring biasing means.

6. The apparatus according to claim 4 and including second biasing means for biasing the rotor blade from the second position to the first position after the rotor blade has moved from the first position to the second position in order to remove the impacted debris.

7. The apparatus according to claim 6 in which the second biasing means is a spring biasing means.

8. The apparatus according to claim 1 in which the rotor blades extend from the first side of the rotor.

9. The apparatus according to claim 1 in which the rotor rotates inside the stator.

10. The apparatus according to claim 1 in which the rotor and the stator are mounted in a frame.

11. The apparatus according to claim 10 in which the frame is disc-shaped.

12. The apparatus according to claim 1 and including torque-balancing means for balancing torque on the apparatus caused by the water flowing in the river.

13. The apparatus according to claim 12 in which the torque-balancing means comprises a tail fin.

* * * * *